(12) United States Patent
Niini

(10) Patent No.: US 7,609,374 B2
(45) Date of Patent: Oct. 27, 2009

(54) METHOD AND SYSTEM FOR DETERMINING THE PROPERTIES OF A SURFACE OF REVOLUTION

(75) Inventor: Ilkka Niini, Espoo (FI)

(73) Assignee: Oy Mapvision Ltd., Espoo (FI)

( * ) Notice: Subject to any disclaimer, the term of this patent is extended or adjusted under 35 U.S.C. 154(b) by 83 days.

(21) Appl. No.: 11/666,132

(22) PCT Filed: Oct. 27, 2005

(86) PCT No.: PCT/FI2005/000464

§ 371 (c)(1),
(2), (4) Date: Jan. 17, 2008

(87) PCT Pub. No.: WO2006/045888

PCT Pub. Date: May 4, 2006

(65) Prior Publication Data

US 2008/0285055 A1 Nov. 20, 2008

(30) Foreign Application Priority Data

Oct. 27, 2004 (FI) ................................. 20041385

(51) Int. Cl.
*G01N 21/00* (2006.01)
(52) U.S. Cl. ..................... 356/241.1; 356/601
(58) Field of Classification Search .............. 356/241.1, 356/601
See application file for complete search history.

(56) References Cited

U.S. PATENT DOCUMENTS

| | | | |
|---|---|---|---|
| 4,315,688 A | 2/1982 | Pryor | |
| 5,771,309 A | 6/1998 | Yamaoka et al. | |
| 5,956,417 A * | 9/1999 | Pryor | 382/154 |
| 6,028,672 A * | 2/2000 | Geng | 356/602 |
| 6,154,279 A | 11/2000 | Thayer | |
| 6,590,669 B1 | 7/2003 | Wagner | |
| 6,909,513 B1 * | 6/2005 | Fujita et al. | 356/601 |
| 2002/0029127 A1 | 3/2002 | Wakashiro | |
| 2005/0068544 A1 * | 3/2005 | Doemens et al. | 356/601 |

FOREIGN PATENT DOCUMENTS

| | | |
|---|---|---|
| CA | 2 309 008 | 11/2000 |
| JP | 2003-248813 | 9/2003 |
| JP | 2004-352308 | 11/2004 |

* cited by examiner

*Primary Examiner*—Roy Punnoose
(74) *Attorney, Agent, or Firm*—Frommer Lawrence & Haug LLP; Ronald R. Santucci

(57) ABSTRACT

The invention relates to a method and system for determining the direction and location of the symmetry axis of a revolution-shaped article. Furthermore, the invention enables one to determine the radius of the article as well as the pitch of a possible thread. In the arrangement of the invention, the article being measured is illuminated using light sources arranged in direct vicinity of the cameras. Each camera is measuring the reflection plane formed from the article being measured based on the light reflected backward from the article. The symmetry axis is determined by calculating the transversal of the reflection planes. The system of the invention uses at least two cameras, but the measurement accuracy can be improved by calculating the symmetry axis from the transversals of the reflection planes of a bigger set of cameras. Furthermore, at least a third camera is required to calculate the pitch of thread.

16 Claims, 5 Drawing Sheets

METHOD AND SYSTEM FOR DETERMINING THE PROPERTIES OF A SURFACE OF REVOLUTION

Figure 1:
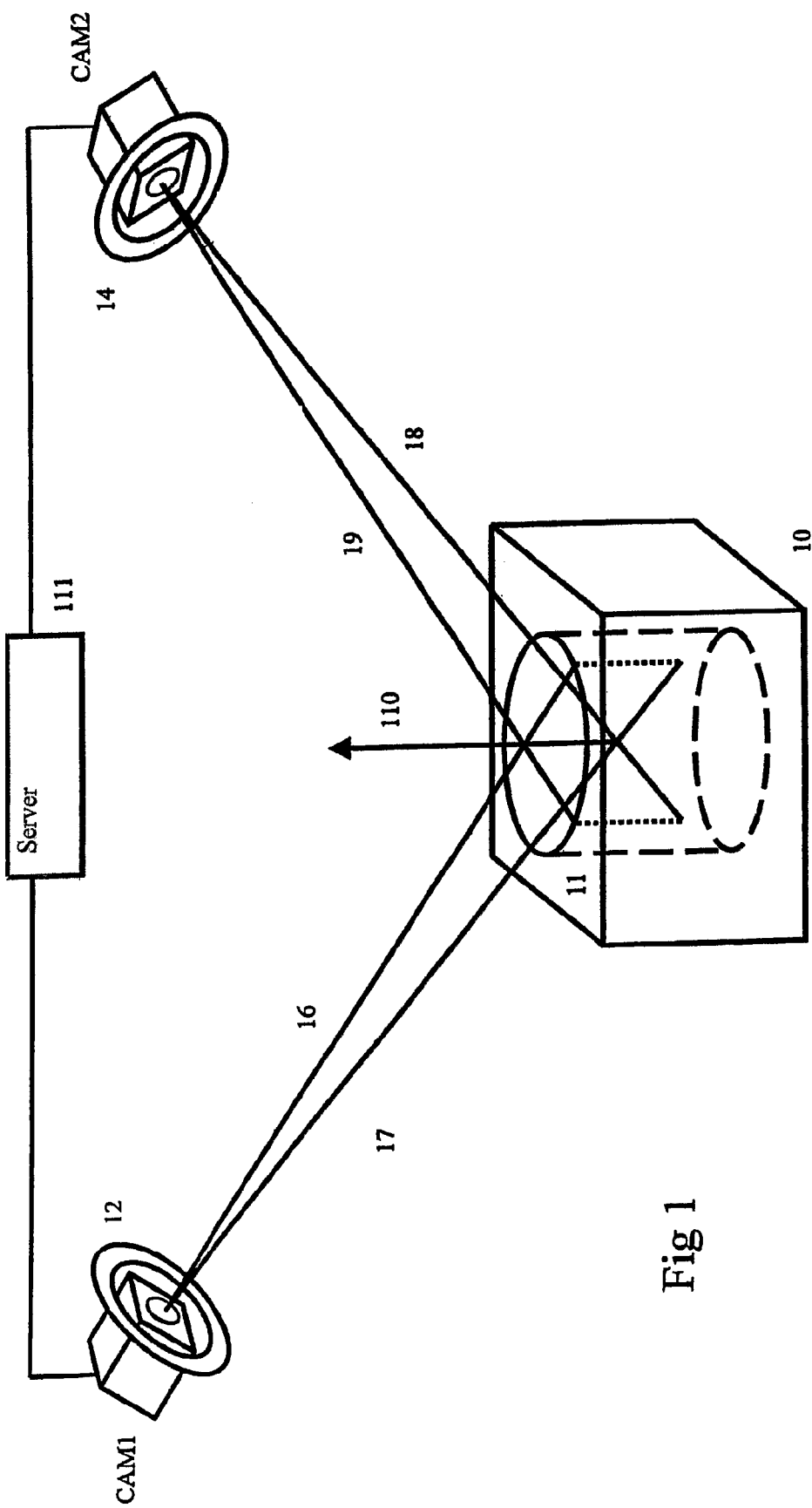

This application is a 371 of PCT/FI2005/000464 filed on Oct. 27, 2005, published on May 4, 2006 under publication number WO 2006/045888 A1 and claims priority benefits of Finnish Patent Application No. 20041385 filed Oct. 27, 2004, the disclosure of which is hereby incorporated by reference.

FIELD OF THE INVENTION

The present invention relates to a method and system for determining a symmetry axis. In particular, the invention relates to determining the direction and location of the symmetry axis of a revolution-shaped article or hole.

BACKGROUND OF THE INVENTION

In industrial production, quality control has become an increasingly important part of the manufacturing process. As the products get complicated, the tolerances are reduced and manufacturing lots increased, various machine vision systems have proven good due to their speed and the measurement manner non-contacting the article.

However, the number of problems that are suited to be solved using machine vision systems often is restricted. Typically, machine vision can be used to carry out separate checking and measurement operations two-dimensionally. In case there are more than one object being measured, each measurement is usually made using separate imaging devices and even at different measuring stations or manufacturing cells. In that case, there is no way of finding out the mutual relations and measurements between the details of the entire article. A typical example of a situation such as this represents an article the bores drilled into which shall be located, with sufficient accuracy, in the same straight line for the purpose of installing the shaft at a later point. In that case, each of the bores can be within the tolerances as regards, for example, their dimensions and roundness, but nevertheless the shaft cannot be installed due to the erroneous mutual locations of the bores.

The problem can usually be solved using three-dimensional machine vision technology. Known in prior art is, for example, an arrangement as disclosed in patent FI111755 using which the aforementioned three-dimensional measurement can be implemented.

A conventional three-dimensional measurement system has the limitation that while it allows accurate measurement of individual spots, determining the location and position of a single component attached to the whole may still prove problematic. Typically, this kind of situation occurs when one cannot obtain a sufficient number of accurate observations regarding the component, for example, by measuring a set of known spots. The component does not necessarily contain so many visible spot-like details or details that could be distinguished from one another so that all the degrees of freedom related to the location of the component could be determined. A conventional component of this kind is a nut, a threaded sleeve or a cylinder welded to the hole outside thereof. The machine vision system can be used to measure the diameter and location of the hole, but the welded part does not offer such details to be viewed by the camera that could be used to determine the direction or location of the axis thereof. The wrong position or place of the component will guide the bolt or shaft to be mounted thereto in the wrong direction. At its worst, this will prevent the assembly of the end product. Measuring the place of a component optically from the mounting side is not often possible because of the solid casing structure. Besides, the accurate location of the component, based on the measurement values given by the exterior, does not guarantee the correct position or place of the cylindrical hole or thread included in it, which in the end will, however, decide whether the installation of the shaft or bolt can be successfully implemented.

A conventional way of ensuring the place of a component and the direction of the axis thereof is to use a mechanical gauge, possibly attached to a special measurement jig. In case the gauge fits the hole, the article will do. If, in turn, the gauge does not fit in, the article must be discarded. This method is, however, a very laborious and inflexible one especially when products are manufactured in very big series. A gauge is slow to work with and is a mechanically wearing part, and gauges are usually needed several to secure one object (upper and lower tolerance gauges). A modern production model that is based on statistical quality control methods requires, in addition, collecting of more versatile measurement data on the manufacturing process than the rough "works or not" estimate a gauge can give.

Reference publication US 2002/0029127 A1 discloses an arrangement in which the location of the middle axis of a cylindrical or revolution-shaped article is measured using a stereo camera system. This kind of system involves, however, serious disadvantages, which impede its utilisation in industrial use. The arrangement of the reference publication uses two cameras to produce a stereo image, and the number of cameras cannot be increased to improve the accuracy. Further, the system of the reference publication is based on conventional technology in which the shapes of the articles are determined based on the border lines imaged. Border lines are, however, not easily visible if the object being measured is e.g. a drilled bore; instead in that case the measurement is limited to the mouth of bore while the actual geometry of the bore remains unknown. Industrial applications, however, often use holes that can be straight or slanting, and can be provided with a thread, so the measurement of the hole geometry is desirable. In addition, we must note that the arrangement of the reference publication uses an approximate mathematical model and additional mathematical conversions that surely weaken the measurement accuracy.

OBJECTIVE OF THE INVENTION

The method and system of the invention enable one to determine the direction and location of the symmetry axis of revolution-shaped articles or holes. The invention is particularly usable as a part of a three-dimensional measurement system in which the locations (usually so-called projection centres) and orientations are already known and the measurement results are in the same co-ordinates with the three-dimensional measurements obtained by other methods.

SUMMARY OF THE INVENTION

The present invention comprises a method and system for determining the direction and location of the symmetry axis of a revolution-shaped article or hole. The system of the invention takes images of the article being measured using at least two imaging devices, usually electronic cameras. Arranged in conjunction with the cameras are light sources that are preferably placed as close as possible to the optical axis of each camera so that light enters the object being measured with sufficient accuracy from the same direction with the camera's direction. The surface of the article being measured shall be such that it reflects light backwards. From the standpoint of the invention, this is, however, not a very significant limitation as in practice all articles, except for some mirror-like or transparent objects are such as these. The cameras are used to measure either the reflected light beams turning directly toward or the reflection stripe formed by these that is visible in the image, and based on these there are formed the observation vectors between different reflection spots i.e. observation spots and the location spots of the cameras. Observation planes are formed based on the observation vectors or the reflection stripe of each camera, which, when combined, intersect with the observation planes (reflection planes) formed by other cameras. The transversal of the observation planes is parallel to the symmetry axis of the article, and its location corresponds to the location of the symmetry axis within the measurement accuracy.

It is usually necessary to express the location of the symmetry axis with respect to some separately determined surface or other plane of the article being measured. One typical example is a surface having a nut embedded therein. The border line of the hole in the surface can be measured separately, and based on it one can determine a plane whose section with the spatial line corresponding to the symmetry axis gives the nominal location of the symmetry axis. The method can, however, be utilised independently, irrespective of other measurement methods. It must, however, be noted that the invention can be used for the purpose of determining the symmetry axis of an article by utilising the outer surface of the article provided that the article does not contain a hole or the symmetry axis determined by the outer surface is a more essential quantity as far as the quality is concerned. This can be the case e.g. when a cylindrical peg is provided with a tube outside the peg.

The present invention is particularly advantageous specifically when measuring the straight or threaded inner surfaces of a body of revolution e.g. when the article is provided with a bar (a shaft) mounted therein, whose orientation is determined by the body of revolution. When the direction and location of the body of revolution are known, the orientation of the bar to be installed and its acceptability with respect to the given tolerances can be calculated. Further, the invention is advantageous in any application where it is necessary to obtain measurement information on the parallel orientation of several different bodies of revolution.

In addition to the direction and location of the symmetry axis, the invention enables one to calculate the radius of the article or hole being measured. When measuring the radius, the illumination apparatus arranged in conjunction with the illumination apparatus of the first camera of the system is used to illuminate the article. This illumination is imaged using the second camera of the system, enabling one to obtain, based on the observations, a transversal for the sheathing of the measurement object. Based on the location of this transversal and based on the previously calculated location of the axis it is possible to calculate the length of the radius of the article or hole.

In case the inner or outer surface of the article being measured is provided with threads, it is advantageous to use at least three cameras. These three cameras are used to first image the reflection generated by the illumination apparatus of one's own, just like in the case of two cameras. The thread of an article can be e.g. a screw thread, a bolt thread, a nut thread or the like. Transversals are generated based on the measurement results enabling one to determine in the middle of the article a virtual cylinder whose midpoint and radius can be calculated. Based on the radius of the article or hole, the radius of the virtual cylinder and the profile of the thread of the article it is possible to calculate the pitch of thread of the article.

In one embodiment of the invention, the article being manufactured is provided, by welding, with a part to which the shaft head is attached. In order that the shaft head can be attached to the opposing piece, it shall be parallel to the rest of the shaft fasteners in the article. The present invention enables one to calculate the direction of the axis by measuring the location and direction of the symmetry axis of the opposing piece. The location and direction are combined with the rest of the measurement data of the article, enabling one to evaluate whether the shaft fits into the article. The method of the invention does not necessitate some conventional machine vision methods such as the recognition of border lines.

In one embodiment of the invention, there are manufactured and measured articles that are partly bodies of revolution, for example, such that have the shape of a semi-circle. In case the article being measured is disposed on the outer edge of a body of revolution, the symmetry axis can be formed outside the article. This kind of application is e.g. a shape drilled or lathed in the corner of some other article. Measuring shapes such as this by means of a mechanical gauge is difficult. Thus, the present invention has further the advantage of being versatile as it is suitable for clarifying the direction and location of the symmetry axis of many types of symmetric shapes, as well as the radius of a body of revolution and possibly also the pitch of thread.

As compared to the prior art, the invention provides the advantage that it enables dependable and sufficiently simple measurement of articles that up to now have been difficult to measure. The system of the present invention can be used to measure e.g. holes with threads that have been drilled at a slant. This kind of hole enables one to measure the location and direction of the symmetry axis, the radius of the hole and the pitch of thread. Due to dependability and simplicity, the measurement system can be implemented and it can be applied as it is advantageous to implement and fulfils the quality requirements imposed by the industry. The implementation of the invention is flexible and therefore its measurement accuracy can be improved by using more than one camera.

LIST OF FIGURES

Figure 2:
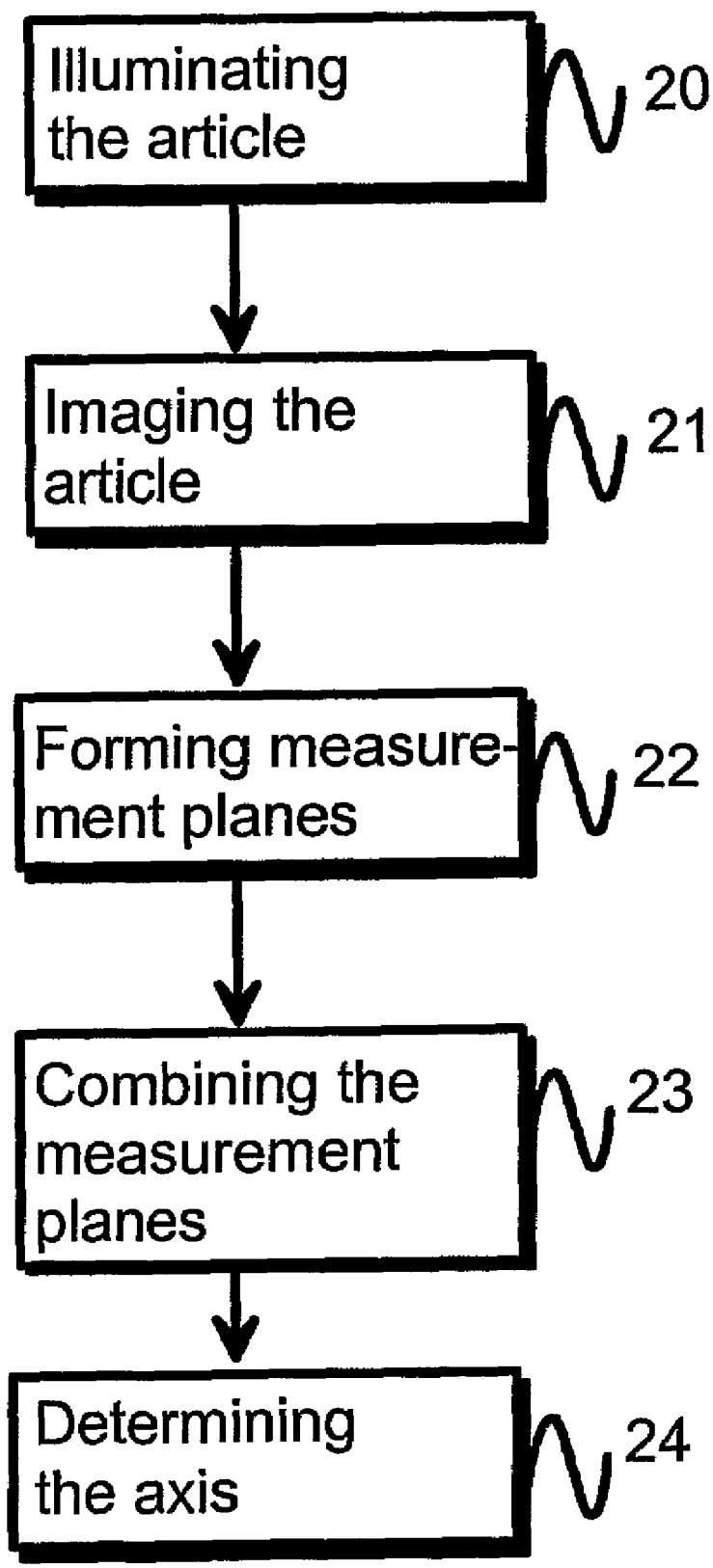
Figure 3:
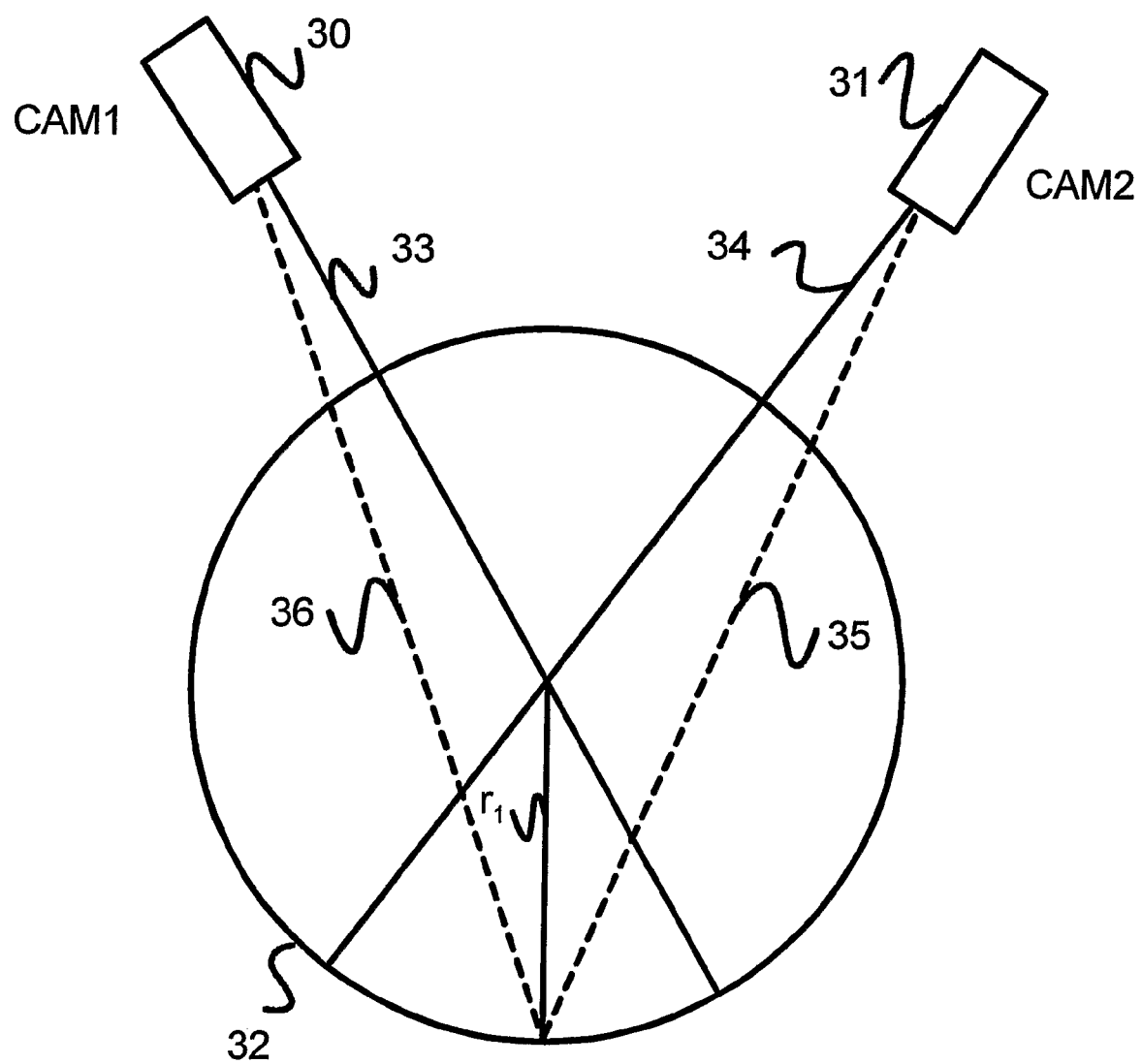
Figure 4:
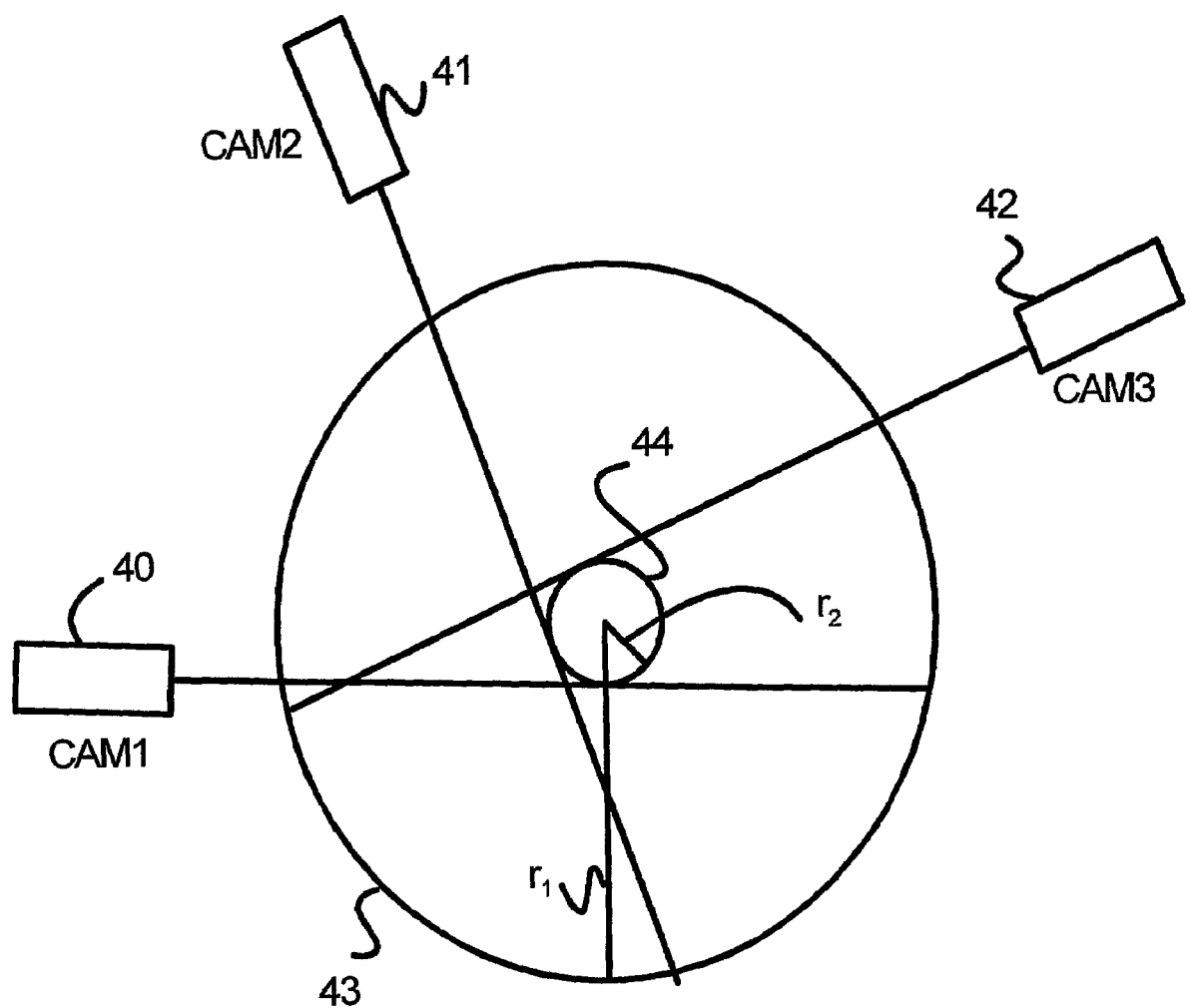
Figure 5:
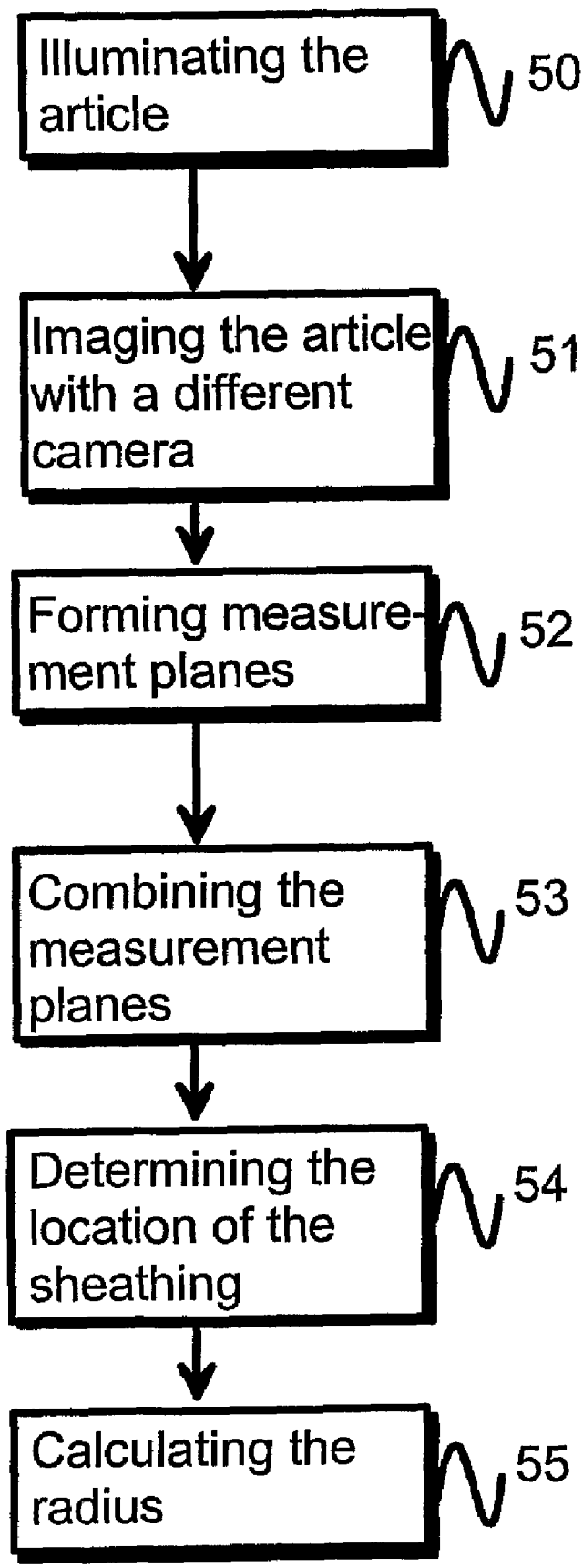

FIG. 1 represents one system of the invention;
FIG. 2 represents one method of the invention;
FIG. 3 represents the system of FIG. 1 shown from above;
FIG. 4 represents one system of the invention using a virtual cylinder, shown from above; and
FIG. 5 represents one method of the invention.

DETAILED DESCRIPTION OF THE INVENTION

FIG. 1 represents one system of the invention. The present system comprises at least two cameras. Typically, there are more cameras, but due to clarity, the present example uses just two cameras CAM1 and CAM2. Both cameras have been connected to a server 111 via a telecommunication connection to process data.

Arranged in conjunction with the cameras are annular illuminators 12 and 14. The type of the illuminator does not impose any specific requirements; instead any conventional illuminator can be used. If necessary, there can be more than one illuminator. Preferably, the illuminator consists of a set of LEDs arranged about the camera. In that case, the light is emitted substantially from the direction of the camera, which is important for the determination of the location of the axis in accordance with the invention. If the illuminator is disposed farther from the camera, then the measurement accuracy of the arrangement with respect to the location suffers, but even in that case the determination of the direction of the axis is accurate enough. With a special optical arrangement, the light can also be emitted directly from the optical axis through the lens of the imaging device.

In the example shown in FIG. 1 the camera system is arranged to take images of an article 10. The article 10 has a hole 11 drilled therein having on the inner surface thereof a nut thread, e.g. a triangle thread in profile. Instead of threads, all kinds of other surfaces can be measured, as long as a sufficient amount of light is reflected back from them to the camera.

The present system measures the direction of the symmetry axis of a hole 11 of an article 10 according to what has been shown in the following section, where the measurement process is first described for each camera specifically. The measurement process uses e.g. camera CAM1, whereby the article is illuminated using an illuminator 12. The camera is used to take images of the article, whereby observation vectors 16 and 17 are formed. The observation vectors 16 and 17 are reflected back to the camera from the sheathing (shown by a broken line) of the hole 11 as seen from the camera CAM1. Observation vector 16 is typically reflected from the uppermost visible spot while observation vector 17 typically from the lower-most visible spot. In this manner, the observation vectors 16 and 17 form with the sheathing of the hole a plane having the shape of a triangle. A corresponding measurement is made using camera CAM2, enabling one to obtain observation vectors 18 and 19, which form a second plane together with the sheathing of the hole as seen from camera CAM2. The plane can also be calculated by means of a reflection line or straight (shown by a broken line) measured directly from the image.

The planes thus formed cut a hole inside and form a transversal 110 that is parallel to the symmetry axis of the hole and is disposed in the middle axis of the hole within the measurement accuracy. The measurement accuracy of the system can be improved by using several cameras and by calculating the symmetry axis from several values.

FIG. 2 shows one method of the invention for determining the symmetry axis, which is preferably performed using equipment of the type shown in FIG. 1. In the method, an article is illuminated using an illumination apparatus, step 20. The illumination is performed with sufficient accuracy in the direction of the measuring camera. Typically, this is an illumination apparatus arranged in conjunction with the camera. Preferably, the illumination apparatus consists e.g. of an annular illuminator arranged about the camera optics, or of several light sources that have been attached to different sides of the camera so that the midpoint of the total light is disposed very close to the midpoint of the lens system of the camera and at the same time close to the optical axis. The illuminated article is imaged using cameras totalling at least two. The method of the present invention necessitates at least two cameras, but to improve the measurement accuracy, typically several are used.

When the article has been imaged, reflection planes are formed based on the image observations. The reflection planes are formed between the article and the measuring camera based on the light that was reflected back from the surface of the object being measured. The planes are calculated based on the image observations and the location information of the cameras in an information system in which the reflection planes are also combined to obtain a transversal, step 23. In the present system and method, combining the reflection planes means forming the section of the planes to obtain a transversal. As a result of combining the reflection planes, a transversal is obtained based on which the location and direction of the symmetry axis are determined, step 24. In case one uses more than two cameras, the location of the symmetry axis is calculated based on more than one transversal by using some of the previously known mathematical equalisation methods. In case the location of a plane significantly deviates from the other ones, it can be discarded.

FIGS. 1 and 2 show a simplified case which is well applicable for determining the location and direction of the symmetry axis of smooth-surface articles. In case the inner surface of the article is rough, or if there is a wish to measure its other properties such as the radius or pitch of thread, then additional properties based on the same invention are needed, which are explained in the following with reference to FIGS. 3 and 4.

FIG. 3 illustrates determining the properties of a typically smooth-surface article in a manner similar to that shown in FIG. 1. Due to clarity, FIG. 3 is shown from above, but as regards its basic arrangement, it corresponds to FIG. 1, so the cameras of the figures correspond to each other. In the embodiment as shown in FIG. 3, the direction and location of the symmetry axis are determined as shown in FIG. 3. In addition to this, in FIG. 3, the radius $r_1$ of the article is also determined, which is obtained by clarifying the location of some spatial straight line in the sheathing 32 of the measurement object and by combining this information with the location of the middle axis of the measurement object. In contrast to FIG. 1, the object is now illuminated using the illuminator of the first camera 30, but the image is taken using the second camera 31, and vice versa, respectively. When the cameras are used to image the reflection formed by their own illuminators, it is possible to obtain the transversal of the planes in the middle of the article. When, in turn, the system comprising two cameras is used to image the reflections formed by the illuminators of both cameras so that the illuminator is not the camera's own one, but the illuminator of the other camera in the system, a corresponding transversal is produced in the sheathing 32 of the measurement object. In the figure, the planes formed by the light of the cameras are represented by radiuses 33 and 34. These planes are measured when the cameras image their own illumination apparatuses. Correspondingly, radiuses 33 and 34 represent planes that are formed when light is imaged using the other camera. Based on these planes 35 and 36, as well as the article's middle line calculated from planes 33 and 34, it is possible to calculate the radius $r_1$ of the article.

FIG. 4 illustrates a more complicated measurement case in which the inner side of the article being measured is provided with a thread. By the effect of the thread, the observation planes of the cameras are not intersecting in the middle axis; instead they always pass it on the same side, that is to say by a standard distance resulting from the other properties of a particular thread and article. In that case, a virtual cylinder is formed about the symmetry axis of the article whose radius is determined based on the pitch of thread and the article or the hole therein. Due to this, when compared to the situation shown in FIG. 3, the determination of the middle axis of the article and the pitch of thread cannot be performed using just two cameras; instead at least three cameras are needed for the measurement. As the determination of the middle axis of an article or hole cannot be dependably performed, it is not possible to calculate its radius either. This problem is solved by using several cameras 40, 41 and 42 so that by means of the observation planes calculated based on them it is possible to determine the virtual cylinder 44 formed in the middle of the article. To determine the shape of the virtual cylinder, at least three planes touching it are necessary. These planes are formed based on the observations made by the cameras when they are imaging their own illuminators. Thereafter, it is possible to calculate the radius $r_2$ of the virtual cylinder and the location of the middle axis. The radius $r_2$ of the sheathing 43 of the article being measured is calculated in a manner similar to that shown in FIG. 3. In the example of FIG. 4, the pitch of thread p is calculated by means of radiuses $r_1$ and $r_2$ as follows:

$$p = \frac{2\pi r_1 r_2 \tan\left(\frac{\alpha}{2}\right)}{\sqrt{r_1^2 - r_2^2}}$$

In the equation the aforementioned $\alpha$ corresponds to the angle of the triangle of the basic profile of the thread, and is typically obtained from a known standard of a thread system, and is, for example, the angle of an equilateral triangle, that is 60°. If $r_2$ is only a fraction of $r_1$ value, as it typically is the case, then it is possible to use an approximate equation:

$$p = 2\pi r_2 \tan\left(\frac{\alpha}{2}\right)$$

It must be noted that the configurations with two and three cameras used in the system only fulfil the minimum requirement of cameras, and that the virtual cylinder can be calculated both for articles with an inner thread and an outer thread.

By increasing the number of cameras, it is possible to improve the measurement accuracy, and also clearly erroneous measurement results can be deleted from most observations using statistical-mathematical methods. Typically, there are several pairs of illuminators/cameras. It must also be noted that the placement of the cameras affects the success of the measurement. The cameras shall be so positioned that it is easy for them to perceive the illumination patterns to be formed on the inner surfaces of articles disposed in different positions. Typically, this means an angle of about 30-60 degrees in relation to the axis of the article being measured, but it is possible to use any angle enabling one to achieve an observable light pattern.

FIG. 5 describes the functional method of the system as shown in FIG. 3. The method is started by illuminating the article with the illumination apparatus of the first camera, step 50. The light reflected from the article is imaged using the second camera, step 51. Thereafter, measurement planes are formed from the observations thus imaged, step 52. Thereafter, the measurement planes are combined to obtain a transversal, step 53. When the measurement planes have been combined, the location of the sheathing or edge is determined, step 54. Thereafter, it is possible to calculate the radius of the hole or article based on the location of the sheathing and the location of the axis determined using the method of FIG. 2, step 55. Thus, it must be noted that the method of FIG. 5 for calculating the radius can only be used together with the method of FIG. 2 because to calculate the radius, both the location of the sheathing calculated in FIG. 5 and the location of the symmetry axis calculated in FIG. 2 are needed.

The method corresponding to FIG. 4 is similar to the methods described above. In the determination of the location of the symmetry axis, the method only deviates as regards the determination of the virtual cylinder. The measurement case as illustrated by the system 3 of the figure is in fact a special case in the measurement case of FIG. 4 because if in the arrangement of FIG. 3, the virtual cylinder corresponding to the measurement case of FIG. 4 was determined, then it would be reduced to form a spatial straight line, whereby the tangential planes of the cylinder would also intersect in the same straight line. Thus, in steps 23 and 24 of the method of FIG. 2, after the measurement planes have been combined, a virtual cylinder is formed from the observations whose middle straight is the location of the symmetry axis. It is obvious to a person skilled in the art that when determining the virtual cylinder or middle axis, one shall use the adaptation and equalisation method of observations in case there are pairs of illuminators/cameras more than the required minimum number, because the observation vectors or planes calculated from observations made by different cameras are not usually compatible due to the measurement inaccuracy. Similarly, it is obvious to a person skilled in the art that to calculate the pitch of thread, one shall apply in the method the equations presented in conjunction with FIG. 4 after the radiuses of the article and the virtual cylinder have been determined.

The invention is not limited merely to the examples of its embodiments referred to above; instead many variations are possible within the scope of the inventive idea defined by the claims.

The invention claimed is:

1. A method for determining the symmetry axis of an article, a hole or some other shape of revolution, the method comprising the steps of:
    illuminating the article with an illumination apparatus;
    generating measurement results by taking images of the article using at least two imaging devices;
    combining the measurement results measured by individual imaging devices to form an end result;
    wherein in the method:
    illuminating the article from the direction of the imaging devices using illumination apparatuses;
    generating the first measurement results by taking images of the article using at least two imaging devices, in which the reflection straight lines produced by the illumination apparatuses and visible to each imaging device form a reflection plane with the location spot of the imaging device; and
    determining the direction and location of the symmetry axis by calculating them from one or more transversals of the aforementioned reflection planes.

2. The method as defined in claim 1, wherein one measures a symmetric shape of revolution.

3. The method as defined in claim 1, wherein the illumination apparatus is arranged about the camera symmetrically.

4. The method as defined in claim 1, wherein the illuminator is arranged in the middle of the camera optics.

5. The method as defined in claim 1, wherein the method further comprises the steps of:
    illuminating the article using the illumination apparatus arranged in conjunction with the first camera;
    generating second measurement results by imaging the light of the illumination apparatus arranged in conjunction with the aforementioned first camera using the second camera;
    combining the second measurement results to calculate the location of the second transversal in the sheathing of the measurement object; and
    calculating the radius of the article based on the location of the aforementioned symmetry axis and the second transversal.

6. The method as defined in claim 1, wherein determining, based on the first measurement results, a virtual cylinder about the middle straight line of the article.

7. The method as defined in claim 6, wherein calculating the radius of the virtual cylinder based on the observations.

8. The method as defined in claim 7, wherein calculating the pitch of thread of the article based on the radius of the article or the hole therein, the radius of the aforementioned virtual cylinder and the profile of the thread.

9. A system for determining the symmetry axis of an article, the system comprising:
the article to be measured;
at least two illumination apparatuses for illuminating the article being measured;
at least two cameras (CAM1, CAM2) for measuring the article being measured; and
a central processing unit (111) for calculating the measurement results;
wherein in the system:
the illumination apparatuses are arranged to illuminate the article being measured from the direction of the cameras;
the surface of the article being measured is arranged to reflect light back towards the camera;
the cameras are arranged to measure the reflections; and
the central processing unit (111) is arranged to determine the symmetry axis by combining the reflection planes measured by the cameras, as well as by calculating the direction and location of their one or more transversals.

10. The system as defined in claim 9, wherein the article or shape being measured is a symmetrical shape of revolution.

11. The system as defined in claim 9, wherein the illumination apparatus, which comprises a set of arranged light sources, is an annular illuminator arranged about the camera.

12. The system as defined in claim 9, wherein the illumination apparatus, which comprises a set of arranged light sources, is an illuminator arranged in the middle of the optics.

13. The system as defined in claim 9, wherein the system is further arranged to image the light produced by the illumination apparatus arranged in conjunction with the first camera using the second camera to determine the location of the sheathing of the article, and the central processing unit (111) is further arranged to calculate the radius of the article based on the location of the symmetry axis and sheathing of the article.

14. The system as defined in claim 9, wherein the system further comprises at least a third camera to determine a virtual cylinder about the symmetry axis of the article.

15. The system as defined in claim 14, wherein the central processing unit (111) is arranged to calculate the radius of the virtual cylinder based on the observations.

16. The system as defined in claim 15, wherein the central processing unit (111) is arranged to calculate the pitch of thread of the article based on the radius of the article or hole, the radius of the aforementioned virtual cylinder and the profile of the thread.

* * * * *